L. W. CHUBB.
ELECTRICAL SYSTEM.
APPLICATION FILED OCT. 9, 1915.
1,171,399.
Patented Feb. 8, 1916.
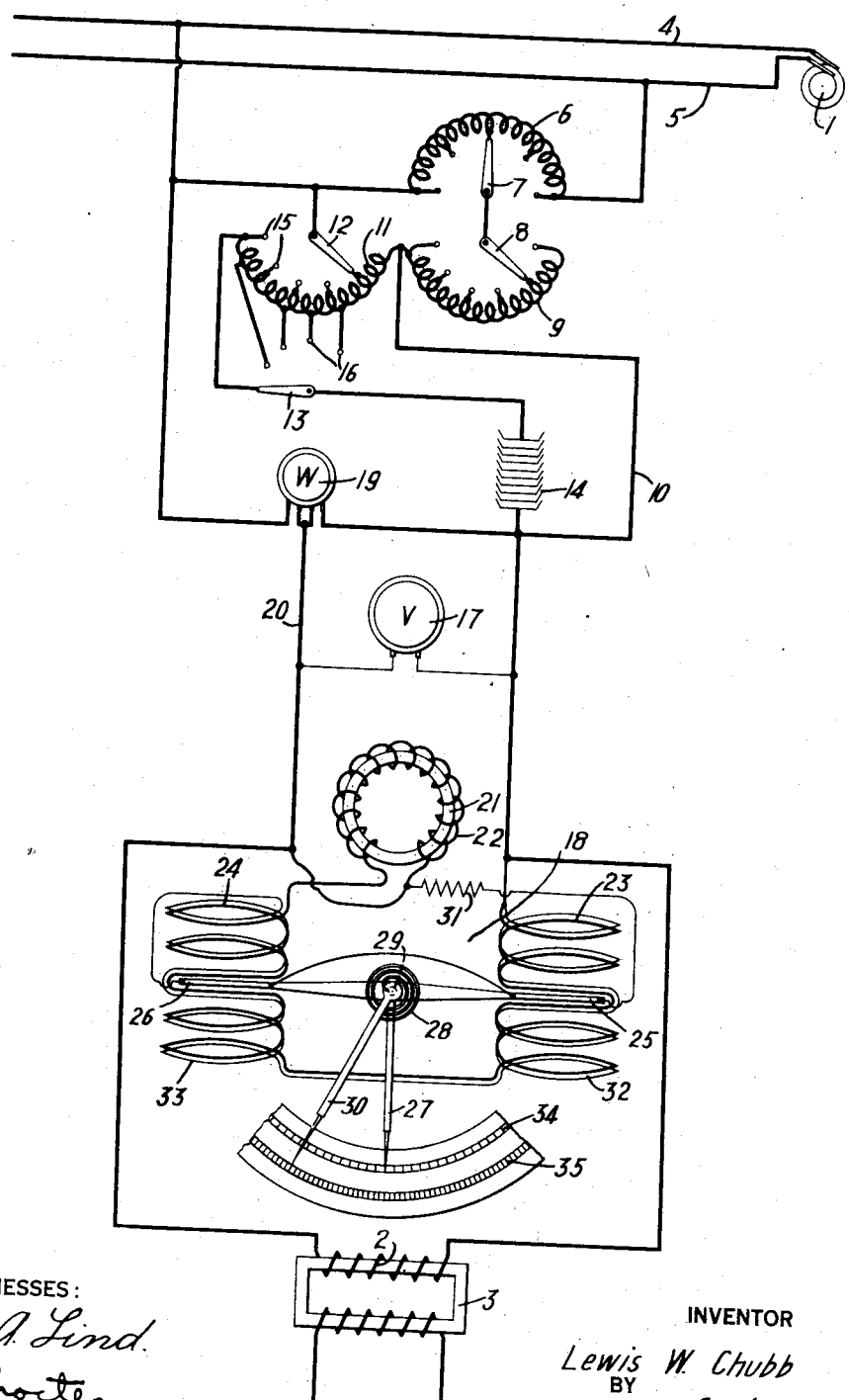
WITNESSES:
Fred A. Lind.
J H Procter
INVENTOR
Lewis W. Chubb
BY
Wesley G. Carr
ATTORNEY

UNITED STATES PATENT OFFICE.

LEWIS W. CHUBB, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,171,399.    Specification of Letters Patent.    Patented Feb. 8, 1916.

Original application filed May 24, 1909, Serial No. 497,972. Divided and application filed September 12, 1910, Serial No. 581,734. Divided and this application filed October 9, 1915. Serial No. 54,963.

*To all whom it may concern:*

Be it known that I, LEWIS W. CHUBB, a citizen of the United States, and a resident of Pittsburgh, in the county of Allegheny and State of Pennsylvania, have invented a new and useful Improvement in Electrical Systems, of which the following is a specification, this application being a division of the application Serial No. 581,734, filed September 12, 1910.

My invention relates to electrical systems and particularly to means for adjusting the form-factors of alternating-current voltage waves.

The object of my invention is to provide means, of the above indicated character, consisting in so connecting an impedance device and an electrolytic condenser to a circuit and in so adjusting the respective potentials of the same that the form-factor of the resultant voltage wave may be any desired value.

My copending application Serial No. 581,734, filed September 12, 1910, of which the present application is a division, sets forth a transformer-testing system comprising means for adjusting the form-factor of an alternating-current voltage wave to that of a sine wave, and means for determining the voltage required to produce the same iron loss in a transformer as is produced by a voltage having sine-wave characteristics.

The core or iron loss of a transformer or other inductive device is dependent upon the wave form of the impressed voltage, a peaked wave giving somewhat lower core loss than a sine wave, and a flat wave giving somewhat higher core loss than the sine wave, and, since the wave forms of the voltage of alternating-current generators usually vary, more or less, from a sine wave, core loss tests on different supply circuits often differ from ten to fifteen per cent. from the value obtained on a sine wave, such differences depending upon how much the fundamental wave of the generator varies from a true sine wave and how much additional distortion may be caused by resistance and reactance in the armature and in the supply circuit. I have determined, that, if the form-factor of the applied voltage wave is the same as that of sine wave, the losses indicated by an alternating-current wattmeter will be the same as the loss on the transformer, under test, when the transformer is supplied with alternating current voltage having sine-wave characteristics.

In the carrying out of my invention, I connect a variable-impedance device in series with the supply circuit, and across the terminals of the supply circuit, I connect a circuit comprising an electrolytic condenser and an auto transformer. The impedance of the impedance device and the potential across the condenser, which is worked above its critical value, are adjusted until the impedance device so peaks the voltage wave, and the condenser so filters out the peaks that the form-factor of the wave may be any desired value.

In order to determine when the form factor is 1.11, or that of a sine wave, I connect an ordinary root-mean-square voltmeter and an iron-loss voltmeter, substantially the same as is set forth in my copending application, Serial No. 497,972, filed May 24, 1909, in shunt to the circuit. The impedance of the impedance device and the voltage across the condenser are adjusted until the root-mean-square voltmeter and the iron-loss voltmeter indicate the same values, thus indicating that the form-factor is the same as that of a wave having sine-wave characteristics.

The single figure, of the accompanying drawing, is a diagrammatic view of an electrical circuit embodying my invention.

An alternating-current generator 1 has two conductors 4 and 5 operatively connected thereto, and an auto transformer 6 is connected across the conductors 4 and 5 for the purpose of supplying energy to the winding 2 of the transformer 3 that is to be tested. The transformer 6 is provided with a movable contact member 7 that is electrically connected to the movable contact member 8 of an impedance device 9 one terminal of which is connected through a conductor 10 to one terminal of the winding 2 and also to one terminal of a second auto-transformer 11. The auto-transformer 11 is provided with a movable contact member 12 that is electrically connected to the conductor 4, and, through a conductor 20, to the other terminal of the winding 2. The transformer 11 is provided with a second movable contact member 13 that is electrically connected to one terminal of an electrolytic condenser 14 the other terminal of which is connected to the conductor 10. The movable contact members 12 and 13 are adapted to engage stationary contact members 15 and 16, respectively, for the purpose of varying the voltage impressed across the condenser 14. A root-mean-square voltmeter 17 is connected across the terminals of the winding 2, as is also an iron-loss voltmeter 18, hereinafter more fully set forth. A wattmeter 19 is so connected to the conductors 10 and 20 as to measure the energy traversing the same.

With the arrangement shown, the sum of the voltage across the inductive winding 2 and the voltage across the impedance device 9 is equal to the voltage of the transformer 6. The winding 2 being inductive takes a distorted lagging current, and the voltage drop across the impedance device 9 is the differential of this current. Hence, the voltage wave impressed across the device 9 is distorted and when subtracted from the voltage wave of the transformer 6, gives a peaked voltage wave of a form-factor relatively greater than is required. If the voltage drop across the condenser 14 is adjusted by moving the movable contact members 12 and 13 until it is above the critical value of the condensers 14, some of the peaked portion of the distorted voltage wave is discarded or shunted through the condenser 14 to so flatten the distorted voltage wave that its form-factor may be substantially 1.11, or any other desired value.

In order to determine when the form-factor is of the desired value, the voltmeters 17 and 18 are connected across the conductors 10 and 20, and, when they indicate the same value, the form-factor of the voltage wave impressed upon the winding 2 will be substantially the same as the voltage wave having sine-wave characteristics.

The iron-loss voltmeter 18 comprises, in general, a closed magnetic circuit of iron, preferably comprising a series of annular punchings, so proportioned that, when the losses in the stationary and movable coils thereof are taken into account, the ratio of the total eddy-current loss to the total hysteresis loss corresponds to that of any ordinary transformer. The iron-loss voltmeter 18 comprises a magnetizable core member 21, a winding 22 thereon, stationary windings 23 and 24, movable windings 25 and 26, a zero pointer 27 attached to the movable member, a spring 28 and an adjusting knob 29 for opposing the torque of the movable member, a pointer 30 attached to the knob 29, a resistor 31, auxiliary windings 32 and 33 by means of which the instrument is made to read the loss in both its shunt and series circuits, and dials 34 and 35 that respectively indicate the voltage which would give the same loss in a transformer when tested on a sine-wave voltage and the watts lost in the instrument itself.

A series circuit extends from the conductor 20, through the winding 22 and the winding 24, to the conductor 10. A shunt circuit is established from the conductor 20, through the resistor 31, the movable windings 25 and 26 and the windings 33 and 32 to the conductor 10. The windings 32 and 33 have the same number of turns as the stationary windings 23 and 24 and in order that the total losses in the instrument may influence the torque thereof. Under these conditions, the dial 35, when properly calibrated, correctly indicates the total loss in the iron-loss volt-meter in order that it may be subtracted from the indication of the wattmeter 19, when the instrument is connected in circuit. The fact that the losses in the instrument influence its voltage reading does not introduce any error because these losses are taken into account in proportioning the total hysteresis to the total eddy-current losses in the device. Thus, when the pointer 30 indicates, on the scale 34, the same voltage as is indicated by the voltmeter 17, it will be understood that the winding 2 is being supplied with potential having sine-wave characteristics. However, the iron-loss voltmeter 18 and the voltmeter 17 have been shown merely for the purpose of illustration, and any other form of device for determining the form-factor may be used instead.

In order to change the form-factor of the voltage wave of the generator 1, the voltage supplied to the winding 2 is adjusted by moving the contact member 7. The voltage across the terminals of the transformer 6 is then equal to the voltage drop across the impedance device 9 plus the drop across the winding 2. As hereinbefore set forth, the impedance device 9 has a peaked voltage wave impressed thereon, and, if the voltage across the condenser 14 is adjusted, by moving the contact members 12 and 13 until the voltage drop across the condenser is above its critical value, the voltage wave peaks will be shunted through the condenser to thus flatten the voltage wave. If the voltage across the condenser 14 is so varied that the voltmeters 17 and 18 indicate the same values, the form-factor of the voltage wave supplied to the winding 2 will be 1.11.

It will be understood that the impedance device 9 may be either a resistor or a reactor, according to the initial form-factor of the voltage wave generated by the generator 1, and it will be further understood that the electrolytic condenser 14 may be of any desired form, in so far as it serves as a valve for filtering out the peaked portions of the wave. Other modifications may be made in my invention without departing from the spirit and scope of the same, as set forth in the appended claims.

I claim as my invention:

1. A form-factor changing apparatus for an electric circuit comprising a variable impedance device connected in the electric circuit for peaking the voltage wave, an electrolytic valve, and means for supplying the valve with variable voltage, said valve being connected in shunt relation to the circuit for limiting the heights of the voltage wave peaks to any desired value.

2. A form-factor changing apparatus for an electric circuit comprising means connected in the electric circuit for changing the heights of the voltage wave peaks, a valve device, and means for changing the value of the voltage impressed across the valve device, said valve device being adapted to discard any desired portion of the voltage wave peaks as changed by the first-mentioned means.

3. A form-factor changing apparatus for an electric circuit comprising means for peaking the voltage wave, a valve device, and means for supplying the valve device with variable voltage, said valve device being connected in shunt relation to the circuit for limiting the heights of the voltage wave peaks to any desired value.

4. Apparatus for changing the form-factor of a peaked voltage wave comprising a circuit upon which the voltage wave is impressed, and variable-voltage means connected in shunt to a part of the circuit for limiting the heights of the voltage-wave peaks.

5. The method of obtaining in an electric circuit a voltage wave having a definite form-factor which consists in combining two voltage waves, and then discarding certain portions of the resultant wave.

6. The method of obtaining in an electric circuit a voltage wave having a definite form-factor which consists in combining two voltage waves to produce a resultant peaked voltage wave, and then discarding certain portion of the peaks of the resultant wave.

7. The method of changing the form-factor of the voltage wave applied to an electric circuit which consists in combining the applied voltage wave with a distorted voltage wave, and then discarding predetermined portions of the voltage wave thus constituted.

8. The method of obtaining in an electric circuit a voltage wave having a definite form-factor which consists in combining the applied voltage wave with a distorted voltage wave to produce a resultant peaked voltage wave, and then discarding predetermined portions of the peaks of the resultant wave.

9. The method of obtaining in an electric circuit a voltage wave having a predetermined form-factor which consists in discarding certain portions of the peaks of the wave applied to the circuit.

In testimony whereof I have hereunto subscribed my name this 28th day of Sept. 1915.

LEWIS W. CHUBB.

Copies of this patent may be obtained for five cents each, by addressing the "Commissioner of Patents, Washington, D. C."